United States Patent [19]
Wei

[11] Patent Number: 5,258,987
[45] Date of Patent: Nov. 2, 1993

[54] MULTILEVEL CODING USING TRELLIS-CODED MODULATION AND REED-SOLOMON CODES

[75] Inventor: Lee-Fang Wei, Lincroft, N.J.

[73] Assignee: AT&T Bell Laboratories, Murray Hill, N.J.

[21] Appl. No.: 869,985

[22] Filed: Apr. 16, 1992

[51] Int. Cl.⁵ .............................................. G06F 11/10
[52] U.S. Cl. ..................................... 371/43; 371/37.1
[58] Field of Search .................... 371/37.1, 37.4, 37.5, 371/43-45

[56] References Cited

U.S. PATENT DOCUMENTS

| | | | |
|---|---|---|---|
| 5,023,889 | 6/1991 | Divsalar et al. | 371/43 |
| 5,052,000 | 9/1991 | Wang et al. | 371/43 |
| 5,117,427 | 5/1992 | Miyake et al. | 371/43 |

OTHER PUBLICATIONS

*Outage Control in Digital Cellular Systems* by Stuber et al., IEEE Transactions on Vehicular Technology, vol. 40, No. 1, Feb. 1991, pp. 177-187.

*The Performance of Rate-Compatible Punctured Convolutional Codes for Digital Mobile Radio* by Hagenauer et al., IEEE Transactions on Communication, vol. 38, No. 7, Jul. 1990, pp. 966-980.

J. Wu and X. Zhu, "Multi-Level Multidimensional Trellis Codes", *International Symposium on Information Theory*, Abstracts of Papers, 1990, p. 110.

A. Ushirokawa and H. Matsui, "Multilevel Codes for High-Speed Voiceband Data Modem," *Proc. of IEEE Globecom* 1989, pp. 1971-1975.

G. J. Pottie and D. P. Taylor, "Multilevel Codes Based on Partitioning," *IEEE Transactions on Information Theory*, vol. 35, No. 1, Jan. 1989, pp. 87-98.

L. F. Wei, "Trellis-Coded Modulation with Multidimensional Constellations," *IEEE Transactions on Information Theory*, vol. IT-33, No. 4, Jul. 1987, pp. 483-501.

A. M. Michelson and A. H. Levesque, *Error-Control Techniques for Digital Communication*, John Wiley & Sons, 1985, Chapter 6.

*Primary Examiner*—Vincent P. Canney
*Attorney, Agent, or Firm*—Ronald D. Slusky; Gerard A. deBlasi

[57] ABSTRACT

A multilevel coded modulation scheme trellis encodes a portion of the input data and the resulting encoded stream is used to identify a particular one of a predetermined number of subsets of symbols of a predetermined signal constellation. The remaining input data is coded using a Reed-Solomon (RS) code whose output is used to select for transmission a particular symbol from the identified subset. In applications in which phase hits or other channel phenomena may cause the received signal points to be phase-rotated versions of the signal points that were transmitted, differential encoding is included in the overall coded modulation scheme. In different embodiments, the differential encoding/decoding and RS encoding/decoding are in different orders. In one such embodiment, overlapped multilevel codes are used to preserve the advantages afforded by taking a multilevel coding approach.

19 Claims, 10 Drawing Sheets

FIG. 6

| CODING SCHEME | TRELLIS-ENCODED BITS | NON-TRELLIS-ENCODED BITS | DOMINANT ERROR FACTOR |
|---|---|---|---|
| I | 4D 64-STATE TRELLIS CODE | SINGLE-ERROR CORRECTING RS CODE | TRELLIS-ENCODED BITS |
| II | 4D 16-STATE TRELLIS CODE | SINGLE-ERROR CORRECTING RS CODE | TRELLIS-ENCODED BITS |
| III | 4D 16-STATE TRELLIS CODE | NO CODING | NON-TRELLIS-ENCODED BITS |

← ERROR-RATE PERFORMANCE →

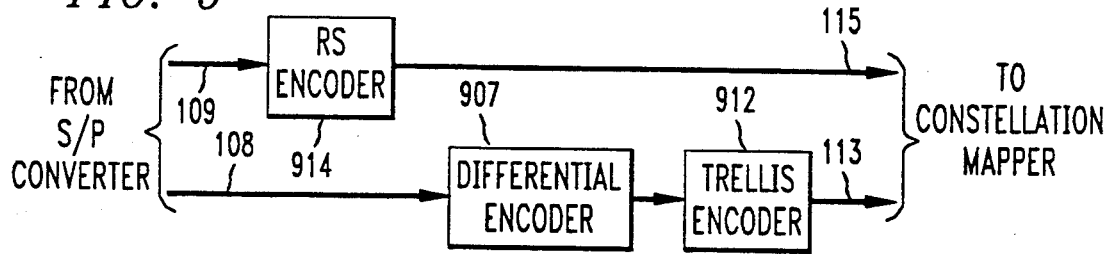
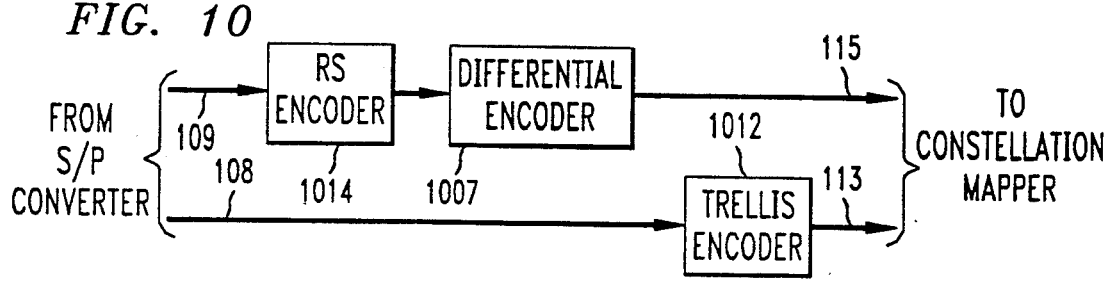
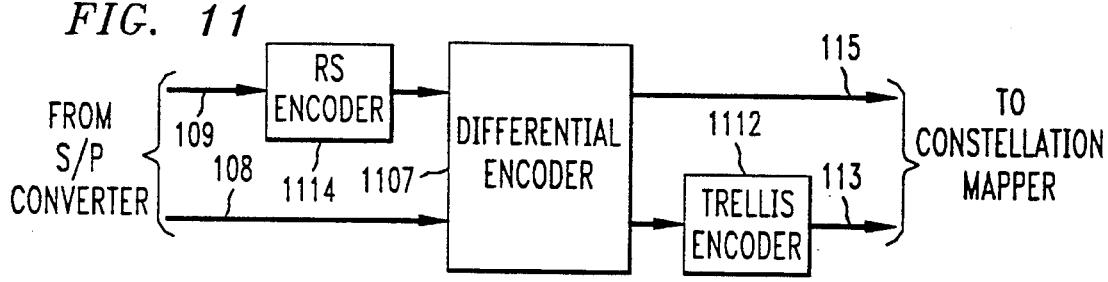
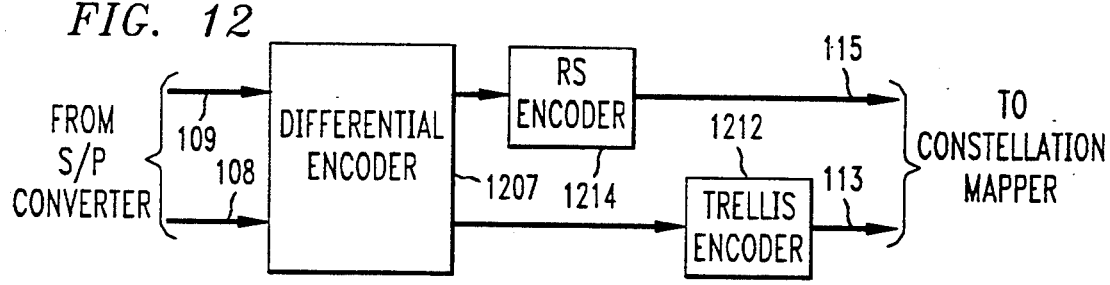
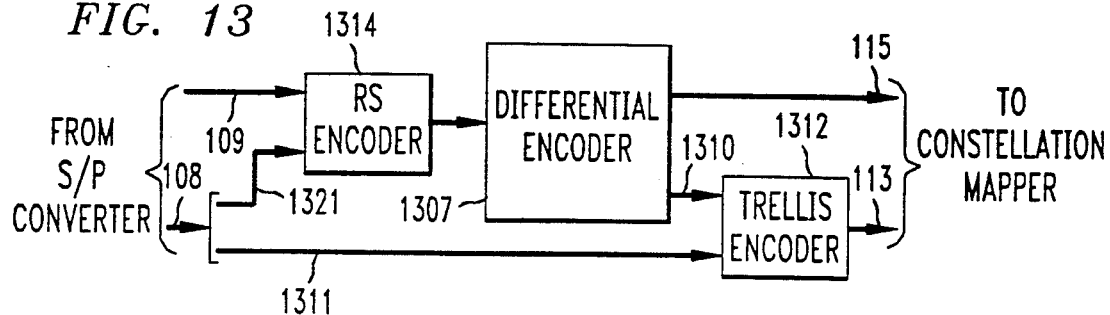

MULTILEVEL CODING USING TRELLIS-CODED MODULATION AND REED-SOLOMON CODES

BACKGROUND OF THE INVENTION

The present invention relates to multilevel coded modulation useful, for example, in voiceband data transmission (e.g., modem) applications.

As used herein, the term "multilevel coded modulation" refers to arrangements in which input data is divided into two or more streams which are individually encoded using respective redundancy codes. The coded outputs are then used jointly to select channel symbols from a predetermined signal constellation for transmission over a communication channel, such as a voiceband telephone channel. The principle advantage of adopting a multilevel coded modulation approach is that it provides the system designer with increased flexibility in designing a coding scheme which provides desired levels of error-rate performance, or "coding gain," while meeting various constraints on code complexity and decoding delay.

Illustrative articles describing multilevel codes are: A. Ushirokawa et al, "Multilevel Codes for High-Speed Voiceband Data Modem," *Proc. of IEEE Globecom 1989*, pp. 1971-5; J. Wu et al, "Multi-Level Multidimensional Trellis Codes," *International Symposium of Information Theory, Abstracts of Papers*, sponsored by IEEE Information Theory Society, 1990, p. 110; and Pottie et al, "Multilevel Codes Based on Partitioning," *IEEE Transactions on Information Theory*, Vol. 35, No. 1, January, 1989, pp. 87-98.

SUMMARY OF THE INVENTION

In accordance with the present invention, I have discovered that a multilevel coded modulation scheme using a particular combination of two of these types of redundancy codes can be particularly advantageous. In particular, a first portion of the input data referred to herein as the "trellis-encoded bits" is trellis encoded, and the resulting encoded stream is used to identify for each of a succession of symbol intervals a particular one of a predetermined number of subsets of symbols of a predetermined constellation. The remaining input data referred to herein as the "non-trellis-encoded bits" is coded using a Reed-Solomon (RS) code whose output is used to select for transmission a particular symbol from the identified subset. Advantageously, large coding gain can be obtained even when the RS code is a high-rate (i.e., low redundancy, highly-bandwidth-efficient) code.

Preferred embodiments use a 2N-dimensional constellation (N=1, 2, 4, 8 . . . ) based on a rectangular lattice. The constellation is partitioned into 4N subsets. The number of states of the trellis code is selected based on the desired error-rate performance for the trellis-encoded bits. The error-rate performance of the non-trellis-encoded bits, were they not to be encoded at all, would typically be worse than that for the trellis-encoded bits, so that the error-rate performance of the coding scheme as a whole, i.e., the overall coding gain, would be determined, or "dominated," by the error-rate performance of the non-trellis-encoded bits. The code implemented by the RS coder, however, is such as to increase the error-rate performance for the non-trellis-encoded bits to a level which is at least as great as that provided for the trellis-encoded bits, so that the error-rate performance for the coding scheme as a whole is higher, it being as great as that which the trellis code provides for the trellis-encoded bits. Advantageously, it turns out that very simple high-rate RS codes can be used in order to achieve this.

I have found two particular multilevel coded modulation schemes to be particularly advantageous. The first uses four-dimensional (4D) constellations, partitioned into eight 4D subsets; a 4D, 64-state trellis code; and a single-error-correcting RS code. The second uses two-dimensional (2D) constellations partitioned into four 2D subsets; a 2D, 64-state trellis code; and a double-error-correcting RS code. Either of these schemes may be used to particular advantage in two applications of current interest. One is the transmission of data at about 19.2 Kbps over dial-up telephone channels. The other is the transmission of data at speeds up to the so-called T1 rate of 1.544 Mbps over the so-called telephone subscriber local loop such as is described generally in U.S. Pat. No. 4,924,492 issued May 9, 1990 to R. D. Gitlin et al.

The invention provides quite a number of advantages. For example, the RS code requires very little redundancy to achieve a desired level of overall error-rate performance, or coding gain; the bandwidth efficiency (bits per symbol) can be made to approach that of a system in which the non-trellis-encoded bits are not coded at all; errors due to impulse noise of any magnitude can be corrected; the transmission of data at various different bit rates is easily accommodated; and the multilevel coded symbols selected for transmission can be interleaved in order to provide enhanced immunity to channel impulse noise and/or correlated noise.

BRIEF DESCRIPTION OF THE DRAWING

FIG. 6 is a table comparing various coded modulation schemes, including multilevel coded modulation schemes embodying the principles of the present invention;

FIGS. 9-13 show various alternative embodiments for the encoder of FIG. 1 including a differential encoder, with the approaches of FIGS. 12 and 13 embodying inventions taught in respective co-pending patent applications;

DETAILED DESCRIPTION

Figure 1:
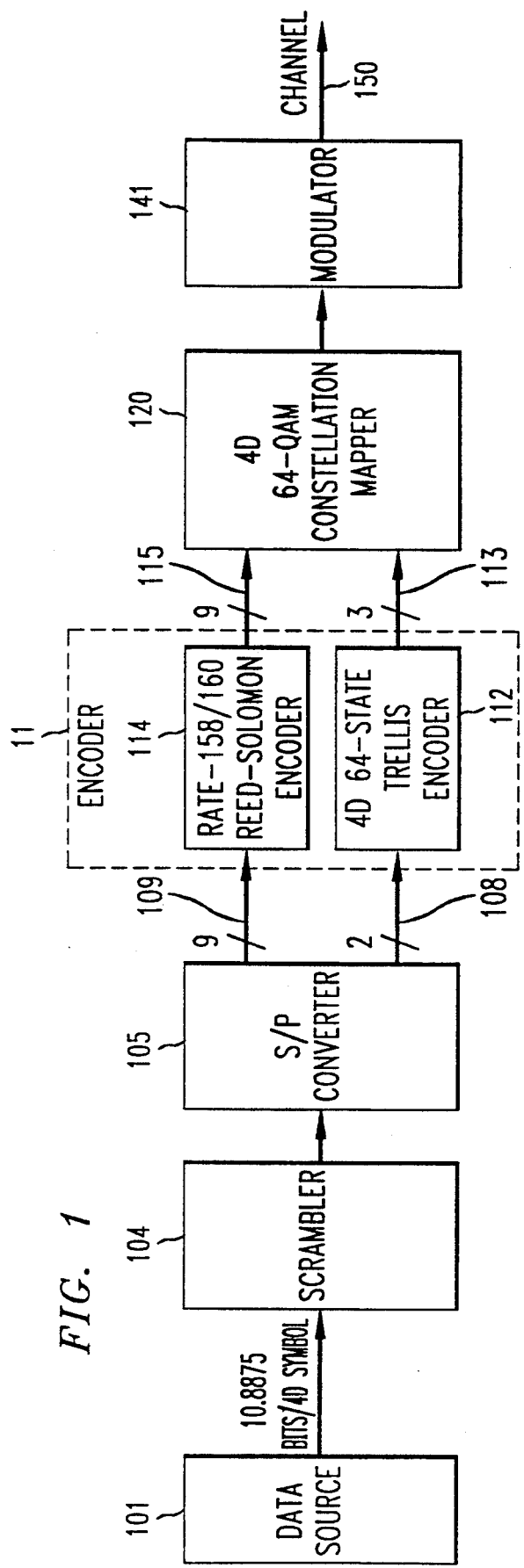
FIG. 1 is a block diagram of the transmitter portion of a telephone voiceband modem utilizing a multilevel coded modulation scheme embodying the principles of the invention.

FIG. 1 is a block diagram of the transmitter portion of a telephone voiceband modem utilizing a multilevel coded modulation scheme embodying the principles of the invention. In overall view, binary data from a data source 101—such as a personal computer—is caused to be represented by 2N-dimensional symbols taken from a predetermined 2N-dimensional signal constellation, which symbols are modulated onto a carrier for transmission over a voiceband telephone channel 150.

Figure 3:
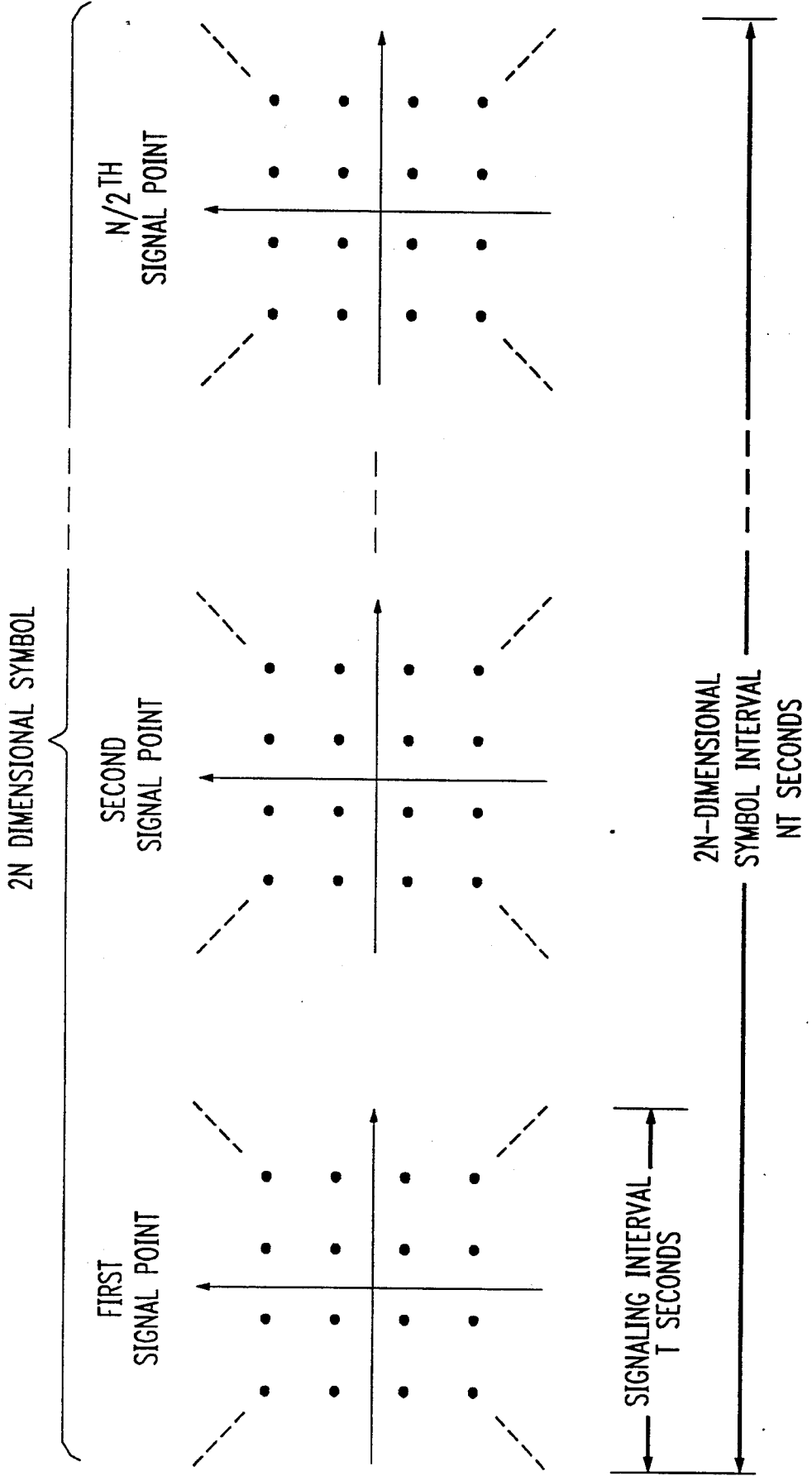
FIG. 3 is a chart helpful in understanding some conventional terminology and concepts.

Attention is directed briefly to FIG. 3, which will be helpful in understanding some of the terminology and concepts that are conventionally used in this art. Each of the aforementioned symbols is comprised of the concatenation of N constituent two-dimensional (2D) "signal points," $N=1, 2, 3, \ldots$. Each such signal point is a point in a predetermined 2D constellation—illustratively shown in FIG. 3 as a so-called QAM constellation. (The number of signal points in the 2D constellation depends on the needs of the application.) A 2N-dimensional symbol is delivered to the transmission channel during N "signaling intervals" of duration T, one signal point in each signaling interval. The assemblage of all the different 2N-dimensional symbols used in any particular coded modulation scheme is referred to as the "2N-dimensional constellation."

Figure 4:
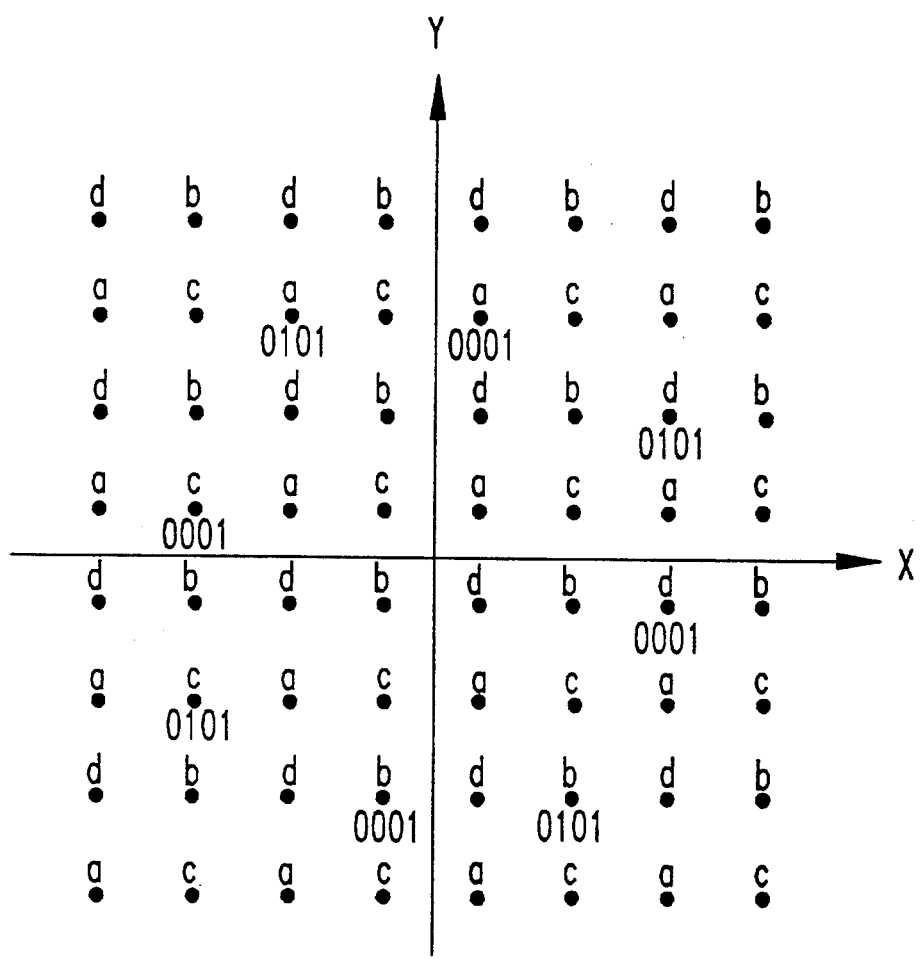
FIG. 4 shows a two-dimensional constellation that may be used in the transmitter of FIG. 1 either by itself or as a constituent of a higher dimensionality, e.g., four-dimensional constellation.

In the illustrative embodiment of FIG. 1, the value of N is 2. That is, the signal constellation is a four-dimensional (4D) constellation comprised of symbols taken from first and second 2D signal constellations in the first and second signaling intervals of each 4D symbol interval, respectively. Illustratively, the same 2D constellation is used for both signaling intervals. That 2D constellation, in particular, is illustratively the 64-signal-point (64-point) QAM constellation shown in FIG. 4. Additionally, all possible combinations of two 2D signal points are used in this embodiment, so that the 4D constellation is comprised of $64^2 = 4096$ 4D symbols.

Returning now to FIG. 1, the stream of bits from source 101 is clocked into scrambler 104 at an average rate of 10.8875 bits per 4D symbol interval. (The significance of this rate will be made clear hereinbelow.) Scrambler 104 randomizes the data in conventional fashion. The serial bit stream output of scrambler 104 is applied to serial-to-parallel (S/P) converter 105, which provides 11-bit output words on leads 108/109 for each 4D symbol interval. (As will be clear from the context, various ones of the leads shown and described herein, such as lead 108 or lead 109, will be understood as being, in actuality, a bundle of leads, each of which carries a respective bit.) In particular, two of the bits are provided on lead 108 and the other nine are provided on lead 109. As will be described in detail hereinbelow, S/P converter 105 occasionally will provide only the two bits on lead 108 without providing any bits on lead 109.

Figure 5:
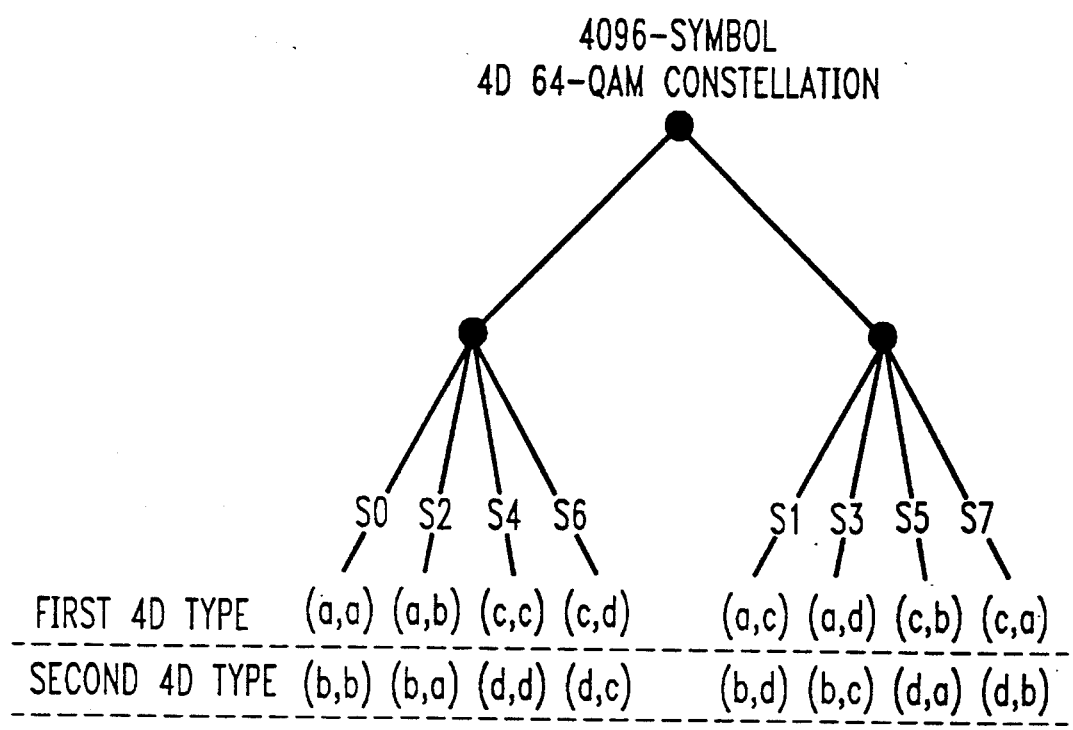
FIG. 5 shows how a four-dimensional constellation used in the illustrative embodiment is partitioned into eight subsets.

The stream of bits on leads 108/109 are applied to an encoder 11 comprised of 4D, 64-state trellis encoder 112 and rate-158/160 Reed-Solomon (hereinafter RS) encoder 114. In particular, the stream of bits, comprising a succession of bit pairs, on lead 108 are supplied to trellis encoder 112, whose output on lead 113 comprises three bits. These three bits identify one of eight predetermined subsets of the 4096 4D symbols of the 4D constellation. The symbols are assigned to subsets in the following, standard way: Each of the two 2D constituent constellations (FIG. 4) of the overall 4D constellation is partitioned into four 2D subsets—denoted a, b, c, and d. FIG. 3 shows by a reference letter which of the four 2D subsets each of the 2D points is assigned to. The eight subsets of the overall 4D constellation are then arrived at as shown in FIG. 5. In particular, 4D subset S0 is comprised of each 4D symbol in which the first and second constituent 2D signal points are both taken from either 2D subset a or 2D subset b. These combinations of signal points are denoted in FIG. 5 by (a,a) and (b,b), each of which is referred to as a "4D type." Each of the other 4D subsets, S1 through S7, is also formed by combining 2D subsets, as indicated in the FIG. Thus, as another example, 4D subset S3 is comprised of each 4D symbol in which the first and second constituent 2D signal points are taken from 2D subsets a and d, respectively—the 4D type labeled (a,d)—or from 2D subsets b and c, respectively—the 4D type labeled (b,c). Since there are 4096 4D symbols overall and eight subsets, each 4D subset contains 512 4D symbols.

In prior art, conventional trellis-coded modulation (TCM) schemes, the bits provided on lead 109 are so-called "uncoded" bits which are used to select for transmission a particular symbol from the 4D subset identified by the bits on lead 113. Thus in a conventional TCM scheme, each nine-bit word on lead 109 would be used to select one of the $2^9 = 512$ 4D symbols of the identified 4D subset.

In accordance with the invention, however, the stream of bits on lead 109 is not used to select a symbol directly. Rather, those bits are first encoded by RS encoder 114, and it is the output of RS encoder 114—which is still in the form of nine-bit words—that is used to select a particular symbol from the identified subset. The overall coding scheme, then, is a "multilevel coded modulation" scheme in that there are multiple—in this case, two—levels of input bits being encoded. Specifically, some of the bits are trellis-encoded and the rest—the so-called "non-trellis-encoded" bits—are Reed-Solomon encoded.

Figure 7:
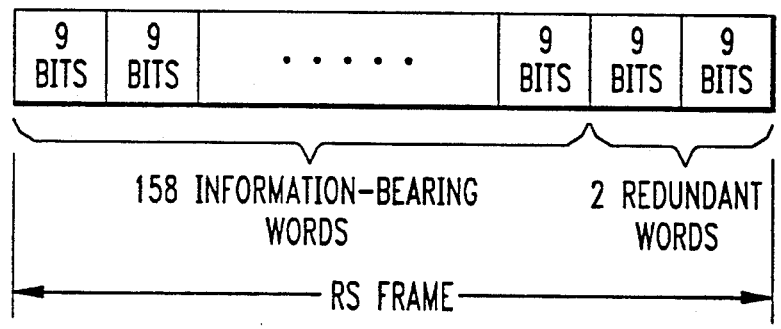
FIG. 7 shows the frame organization used for the Reed-Solomon encoder of the transmitter of FIG. 1.

RS encoder 114 is of a known type—illustratively, a conventional, rate-k/k+2 systematic encoder over $GF(2^9)$ with $k=158$. Reed Solomon coding and decoding is described, for example, in Michelson et al, *Error Control Techniques for Digital Communication*, Chapter 6, John Wiley and Sons, 1985. As such, encoder 114 provides its outputs in RS frames. As shown in FIG. 7, each RS frame is comprised of 160 (i.e., k+2) nine-bit RS words on lead 115. Since the RS code is a so-called systematic code, the first k=158 words of the frame are simply 158 successive input words from lead 109. These are referred to herein as the "information-bearing words." The last two words of the 160-word frame are so-called "redundant words" generated in response to the values of the first 158 words in accordance with the selected RS code. When the overall frame of 160 words is first recovered in the receiver, the presence of these two redundant words therein makes possible the identification and correction of any single, erroneously recovered one or two erased ones of the 160 words. This particular RS code is thus referred to as a single-error-correcting RS code. The operation of RS encoder 114 is synchronized with that of S/P converter 105 in such a way that a nine-bit word is provided on lead 109 for each of the first 158 successive 4D symbol intervals comprising a frame and no bits are provided in the remaining two 4D symbol intervals. It is during these two intervals that encoder 114 outputs the aforementioned two redundant words.

As previously described, three bits are supplied on lead 113 for each of the 160 4D symbol intervals. Twelve bits are thus supplied on leads 113 and 115 for each 4D symbol interval—three of the bits (lead 113) identifying a 4D subset and the remaining nine of the bits (lead 115) selecting a particular symbol of that subset. Those bits are provided to 4D, 64-QAM constellation mapper 120, which outputs representation (e.g., the x and y coordinates) of the two constituent 2D signal points of the selected 4D symbol. Those representations are applied to conventional modulator 141, which applies to channel 150 a passband data signal representing those 2D signal points.

It can now be seen why it is that data source 101 is clocked so as to supply its data at the average rate of 10.8875 bits per 4D symbol interval, as noted above. Of the twelve bits needed to select a particular one of the 4096 4D symbols of the constellation, one redundant bit is introduced by the trellis encoder and an average of 0.1125 (=9 bits×2/160) bits, i.e., the bits of the two redundant words, are introduced by the RS encoder. As a result, the data rate for source 101 needs to be (12−1−0.1125)=10.8875 bits per 4D symbol interval.

Figure 2:
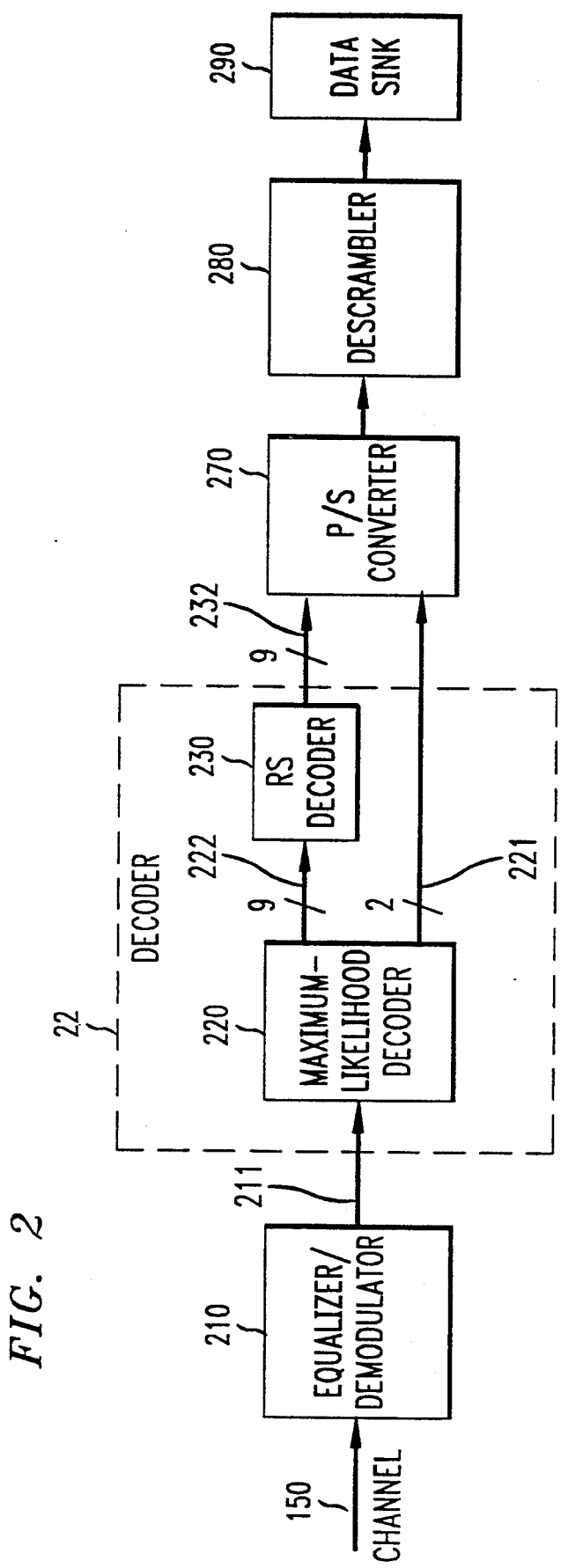
FIG. 2 is a block diagram of the receiver portion of a telephone voiceband modem capable of receiving and processing the data signals generated by the transmitter of FIG. 1.

We turn, now, to the receiver of FIG. 2.

The receiver receives from channel 150 the passband data signal generated by the transmitter of FIG. 1. The signal is first applied to equalizer/demodulator circuitry 210 which, in conventional fashion, recovers a sequence of signal points which it provides on lead 211 to decoder 22 and, more particularly, to maximum-likelihood decoder 220 therein. Because of distortion and other channel anomalies that circuitry 210 is not able to fully compensate for, the signal points on lead 211 are somewhat displaced in 2D signal space from the 2D signal points that were transmitted. As its name implies, the function of maximum-likelihood decoder 220 is a) to determine—based on a knowledge of the trellis code used by trellis encoder 112—what the most likely sequence of transmitted 4D symbols actually was, and b) to provide on leads 221 and 222 eleven bits corresponding to those 4D symbols, i.e., corresponding respectively to the bits on leads 108 and 115 in the transmitter.

The remainder of the processing performed in the receiver of FIG. 2 is the inverse of processing performed in the transmitter. Thus, in particular, RS decoder 230 within decoder 22 operates on each received frame of 160 nine-bit words on lead 222 to recover the 158 information-bearing nine-bit words therein. In particular, as noted above, the decoder is capable of identifying and correcting any error-corrupted single nine-bit word or two erased words provided by maximum-likelihood decoder 220. The stream of 158 corrected information-bearing words is supplied by RS decoder 230 on lead 232. The eleven bits on leads 221 and 232 are thereafter converted to serial form by parallel-to-serial converter 270, descrambled by descrambler 280, and applied to a data sink 290 which may be, for example, a mainframe computer.

The advantages of the invention can be understood by considering the following:

A given trellis code, when used in a unilevel coded modulation scheme, i.e., one in which the non-trellis- encoded bits are not encoded at all, provides particular respective levels of error-rate performance for the trellis-encoded and non-trellis-encoded bits. For many trellis codes of interest, the error-rate performance of the non-trellis-encoded bits is worse than that for the trellis-encoded bits. Thus, the error-rate performance of the coding scheme as a whole, i.e., the overall coding gain, is determined, or "dominated," by the error-rate performance of the non-trellis-encoded bits. More particularly, the error-rate performance for the non-trellis-encoded bits is here a function of the minimum Euclidean distance between the symbols within a subset.

(As will be well appreciated by those skilled in the art, the error-rate performance of the trellis-encoded bits is principally determined by the minimum Euclidean distance between different valid sequences of 4D symbols selected respectively from different valid sequences of 4D subsets, that distance being referred to herein as the "trellis distance." (A "valid" sequence is one that is allowed by the trellis code to actually occur.) By contrast, the error-rate performance of the non-trellis-encoded bits is principally determined by the smaller of a) the trellis distance, or b) the minimum Euclidean distance between different valid sequences of 4D symbols selected respectively from the same valid sequence of 4D subsets, referred to herein as the "non-trellis distance.")

If the overall error-rate performance is not adequate or acceptable for a given application, the prior art approach is to partition the constellation into a greater number of subsets. Since there are then fewer symbols per subset, the distance between them is thereby increased, the increase typically being such that the overall error-rate performance becomes dominated by the error-rate performance of the trellis-encoded bits. The overall error-rate performance is thereby increased. There is a big price to be paid for this, however. The increase in the number of subsets requires the use of a trellis encoder that has an increased number of trellis states in the finite-state machine that implements the code. The complexity of the maximum-likelihood decoder is roughly proportional to the product of the number of subsets and the number of trellis states. Thus, the complexity of the maximum-likelihood decoder is increased dramatically. Indeed, it may be increased to the point that a practical and/or cost-acceptable implementation of the coding scheme may not be possible.

The present invention, by contrast, uses the above-described Reed-Solomon encoding, rather than an increase in the number of subsets, as the mechanism for increasing the error-rate performance of the non-trellis-encoded bits. Indeed, low-complexity RS codes are available that can increase the non-trellis distance to a level which is greater than the trellis distance, with the result that the overall error-rate performance becomes dominated by the error-rate performance provided by the trellis code to the trellis-encoded bits. The latter will then dominate, thereby providing an increased level of error-rate performance for the coding scheme as a whole. Assuming, in the first instance, that the same trellis code is used, the complexity of the maximum-likelihood decoder, advantageously, stays the same. Moreover, a single-error-correcting RS code, such as is used in the above-described illustrative embodiment, is highly bandwidth efficient. In the above embodiment, for example, the "overhead" caused by the RS code is only 0.1125 bits per 4D symbol, as previously seen.

Since the error-rate performance of the trellis-encoded bits now dominates, one can, at this point, achieve an even greater level of overall error-rate performance, if desired, by using a trellis code which, although having more states, does not require an increased number of subsets. The overall effect, then, is to raise the overall error-rate performance while incurring a relatively modest increase in maximum-likelihood decoder complexity.

The foregoing is illustrated graphically in the table of FIG. 6. We take as a "baseline" the modulation scheme III shown in the table. This scheme is based on the 4096-symbol, 4D constellation described above and partitioned into eight subsets as also described above. As shown in the table, this scheme uses a) a 4D, 16-state trellis code for the trellis-encoded bits—illustratively the one disclosed in L. Wei, "Trellis Coded Modulation with Multidimensional Constellations," *IEEE Transactions and Information Theory*, Jul. 1987, and b) no coding for the remaining, non-trellis-encoded bits. For this scheme, the non-trellis-encoded bits dominate the error-rate performance.

The next entry up, modulation scheme II, embodies the principles of the present invention. It uses the same constellation, the same partitioning and the same trellis code as scheme III. Now, however, the non-trellis-encoded bits are encoded using a single-error-correcting RS code, such as the rate-158/160 RS code described above. The table indicates, as discussed above, that the dominant error factor is the trellis-encoded bits. As symbolically represented by the arrow at the left of the table, the overall error-rate performance of this scheme is better than that of scheme III.

The top entry of the table, modulation scheme I, also embodies the principles of the invention, but now uses a more powerful trellis code. Specifically, that code is a 4D, 64-state trellis code which, advantageously, is based on the same eight-subset partitioning of the same 4D constellation. The overall error-rate performance is again improved by virtue of the increased error-state performance which this code provides for the trellis-encoded bits. Note that, in this case, the trellis distance is still not as great as that of the non-trellis distance, so that the error-rate performance of the trellis-encoded bits still dominates.

Figure 8:
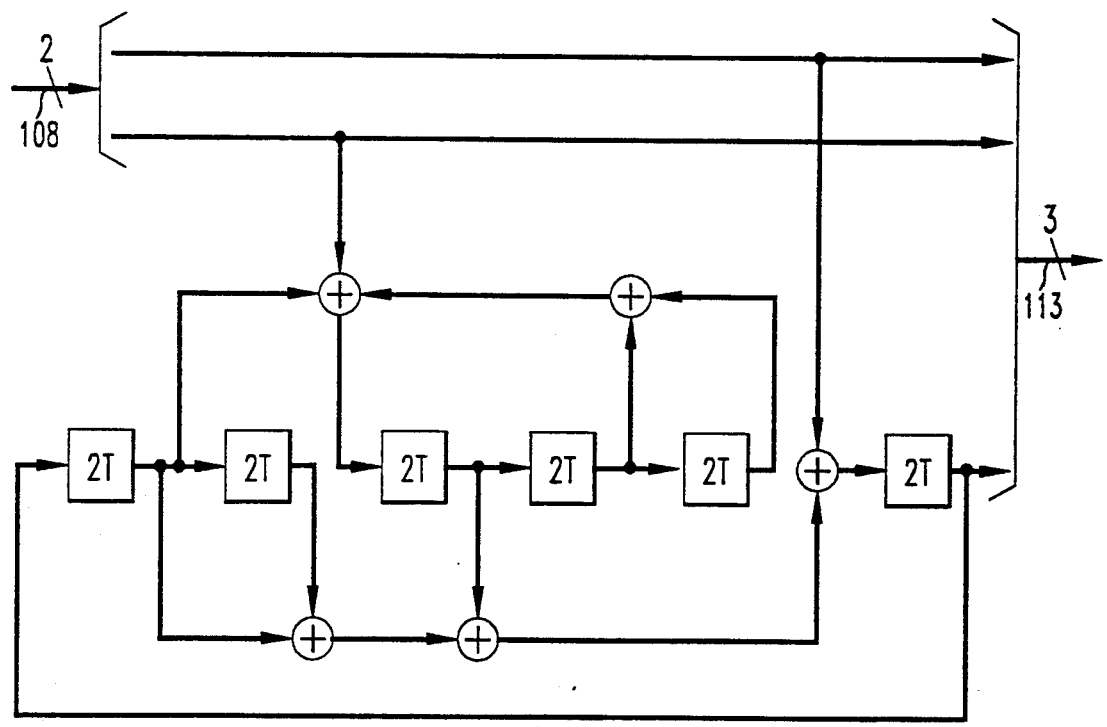
FIG. 8 shows circuitry which implements a particular trellis code used by the trellis encoder of the transmitter of FIG. 1.

The trellis code used by trellis encoder 112 for scheme I is implemented by the circuitry of FIG. 8. In that FIG., each of the elements labeled "2T" is a delay element which delays its input by 2T seconds, i.e., the duration of a 4D symbol interval. The elements labeled "+" are exclusive-OR gates. This is a "systematic" code, so that two of the three output bits on lead 113 are simply the two input bits from lead 108. The third output bit is generated by the circuitry shown in response to the two input bits and delayed versions thereof. As noted above, the three output bits on lead 113 identify one of the eight 4D subsets S0, S1, . . . S7. In particular, the decimal value of the binary word formed by the three output bits—with the upper, middle and lowest bits being the most-, second-most and least-significant bits—defines the subset. For example, the bit pattern 100 appearing on leads 113 identifies subset S4, since binary 100 is equivalent to decimal 4.

The transmitter/receiver system of FIGS. 1-2 is useful in the form shown for applications in which the transmitted signal points are not subjected to so-called "phase rotation" in the channel. For such applications, the bit patterns of the nine non-trellis-encoded bits on lead 115 can be assigned to the 512 4D symbols on the identified 4D subset in an arbitrary manner. In the situation in which phase rotation is an issue, however, so-called differential encoding should be used and certain criteria should be followed in making the bit-pattern-to-symbol assignment. Examples are discussed in detail at a more opportune point hereinbelow.

It will, of course, be appreciated that the 4D code implemented by the encoder of FIG. 8 is merely illustrative. Another code that can be used advantageously to realize encoder 112 is a 2D code in which the trellis code is a standard rate-½, 64-state convolutional code, i.e., the input is one bit per 2D signaling interval and the output is two bits. The latter identify one of the four subsets of the 2D constellation of FIG. 4, with the output values 00, 01, 10 and 11 respectively identifying the subsets a, c, d, b. The RS encoder receives four bits per 2D signaling interval. In order to have the trellis distance dominate, as is desirable, it is necessary in this case to use a double-error-correcting RS code for the non-trellis-encoded bits. Thus there will be four redundant words in each frame. If four-bit words are RS-encoded, the maximum achievable frame length is 17. Such a code, if used, would, in many applications, be very bandwidth inefficient since four out of every 17 words is a redundant word. It is thus desirable to aggregate two signaling-intervals-worth of bits so as to be able to RS encode using eight-bit words, which allows for frame lengths of, for example, 160 words instead of only 17.

The coding gain of this 2D approach is about 1.5 dB greater than that provided by the 4D approach described earlier, but at a cost of supporting a lower bit rate—in fact, more than 0.5 bits per 2D signaling interval less. Thus, the performance of the two approaches is comparable for the same bandwidth efficiency (bits per signaling interval).

It should be noted at this point that the advantages achieved by RS encoding the non-trellis-encoded bits bring them an increase in the time required to decode in the receiver. In particular, RS decoder 230 cannot provide any output on lead 232 until the entire frame of 160 nine-bit words has been supplied to it by maximum-likelihood decoder 220. On an ongoing basis, then, the bits that are output by RS decoder 230 on lead 232 are delayed by 160 4D symbol intervals. Although a delay of this magnitude may be problematic in some applications, in others it may not. In the T1 rate application mentioned above, for example, this delay is only about 1.0 ms, which poses no problem in that application. In those applications where a delay of 160 4D symbol intervals is deemed unacceptable, the frame length of the single-error-correcting RS code can be reduced to, for example, 40 or even 30. The price one pays in this case is a reduction in bandwidth efficiency, i.e., an increase in the average number of redundant word bits per 4D symbol and a concomitant decrease in the bit rate at which the data source can be clocked.

To this point, it has been assumed that no differential encoding is performed within the transmission system. In actuality, however, this is of crucial importance for many applications, including telephone voiceband data transmission. As is about to be explained, however, the inclusion of differential encoding in a multilevel coded modulation scheme cannot always be carried out in the straightforward manner taught by the prior art.

To begin, it will be remembered that differential encoding is needed in voiceband data transmission and other systems in order to compenstate for the fact that so-called phase hits or other channel phenomena may cause the received signal points, as represented at the output of equalizer/demodulator 210, to be phase-rotated versions of the signal points that were transmitted. Since the constellations that are typically used in practice exhibit phase symmetries, it would be possible for the receiver circuitry to mistake a transmitted signal point for a different signal point of the constellation without any indication that an error was made. For example, in the 2D constellation of FIG. 4, a point rotated by any multiple of 90 degrees becomes another point of the constellation (as opposed to falling within the "spaces" between points). The constellation is thus said to have 90-degree phase symmetry. Similarly, a constellation which exhibits this property only upon a 180-degree rotation is said to have 180-degree phase symmetry. In order to compensate for such rotation, it is well known to use so-called differential encoding in order to represent one or more of the data bits to be transmitted not by particular symbols, but by the phase difference between two successively transmitted symbols.

In order for differential encoding to be implemented in a system which uses trellis-coded modulation, a particular criterion must be met. That criterion is that the selected trellis code must exhibit the property that a valid sequence of subsets, after rotation by an amount corresponding to a phase symmetry of the constellation, e.g., 90 degrees, becomes another valid sequence of subsets. (As noted earlier, a "valid" sequence of subsets is one that is allowed by the trellis code to actually occur.) Moreover, in the design of the differential encoder, one must consider the effects that different partitionings may have on the rotation of a subset. There are, in fact, three possible cases, referred to herein as "case 1," "case 2" and "case 3."

In case 1, the symbols of a subset of the constellation always become symbols of a different subset after rotation by an amount corresponding to any phase symmetry of the constellation. For example, in the 2D example discussed above, upon rotation by 90, 180 and 270 degrees, the symbols of a subset a become symbols of subsets c, b, and d, respectively.

In case 2, the symbols of a subset of the constellation always become symbols of the same subset after rotation by an amount corresponding to any phase symmetry of the constellation.

Case 3 is a combination of cases 1 and 2. That is, the symbols of a subset of the constellation become a) symbols of a different subset after rotation by amounts corresponding to at least one phase symmetry of the constellation, and b) symbols of the same subset after rotation by amounts corresponding to at least one other phase symmetry of the constellation. Thus in the above-described 4D code, subset S0 becomes a) subset S4 for 90- or 270-degree rotations, and b) remains what it was upon a 180-degree rotation.

Consider, now, how these requirements affect the implementation of a multilevel code embodying the principles of the invention.

If the symmetries and partitioning of the constellation are such that case 1 obtains, it is appropriate to adopt a differential encoding approach such as used in the prior art. Specifically, one differentially encodes one or more of the trellis-encoded bits, but not any of the non-trellis-encoded bits. FIG. 9 shows an embodiment of encoder 11 implementing such an arrangement. The non-trellis-encoded bits are encoded only by a RS encoder 914, while the trellis-encoded bits are differentially encoded by differential encoder 907 before being trellis-encoded by trellis encoder 912. As is well-known by those skilled in the art, a differential encoder typically operates on a subset—typically one or two)—of the bits that are applied in parallel to it, with the other bits simply being passed through the differential encoder unchanged.

A complementary decoding structure (not shown) would be used to implement decoder 22 in the receiver.

If the symmetries and partitioning of the constellation are such that case 2 obtains, it is again appropriate to adopt a differential encoding approach such as used in the prior art. Here one differentially encodes one or more of the non-trellis-encoded bits, but not any of the trellis-encoded bits. FIG. 10 shows an embodiment of encoder 11 implementing such an arrangement. The trellis-encoded bits are encoded only by trellis encoder 1012, while the non-trellis-encoded bits are differentially encoded by differential encoder 1007 after being encoded by RS encoder 1014. (Again, complementary decoding structure (not shown) would be used to implement decoder 22 in the receiver.) It may also be noted in passing that the way in which the differential decoder works means that the error correction capability of the RS code will have to be increased in this case in order to achieve the same performance as would be achieved if the phase-rotation issue and the differential decoder were not there.

Case 3 requires that both trellis-encoded and non-trellis-encoded bits be differentially encoded. This presents a significant problem—a problem that may be solved in either of two ways, as are respectively taught in two co-pending U.S. patent applications (cited below) filed by me. The problem itself may be understood as follows:

As exemplified by FIG. 10, it is desirable, in general, that if any of the RS-encoded bits are to be differentially encoded, that encoding should be performed after the RS encoding in the transmitter. Complementarily, the differential decoding should be performed in the receiver before the RS decoding. The reason for this is that a conventional RS decoder is not, in general, capable of carrying out its function properly if the non-trellis-encoded bits have been changed as the result of phase rotations. By performing the differential decoding in the receiver prior to the RS decoding, then, it is guaranteed that there will be no phase-rotation effects in the RS decoder input bits (assuming an appropriate choice for the trellis encoder).

Although this approach will, indeed, be effective if only non-trellis-encoded bits are differentially encoded—which, again, is the situation shown in FIG. 10, corresponding to case 2—I have realized that there is a subtle, but very important, problem whenever the bits to be differentially encoded include not only non-trellis-encoded bits, but also trellis-encoded bits, i.e., case 3. The problem arises from the fact that those bits must be processed interdependently in both the differential encoder and the differential decoder. A structure of encoder 11 that one might think of using for this case is shown in FIG. 11, wherein the RS-encoded bits generated by RS encoder 1114 are differentially encoded interdependently with the trellis-encoded bits by differential encoder 1117, the resulting differentially encoded trellis-encoded bits thereupon being extended to trellis encoder 1112. The complementary structure that would be used for decoder 22 is shown in FIG. 14 as comprising maximum-likelihood decoder 1420, differential decoder 1407 and RS decoder 1430.

Figure 14:
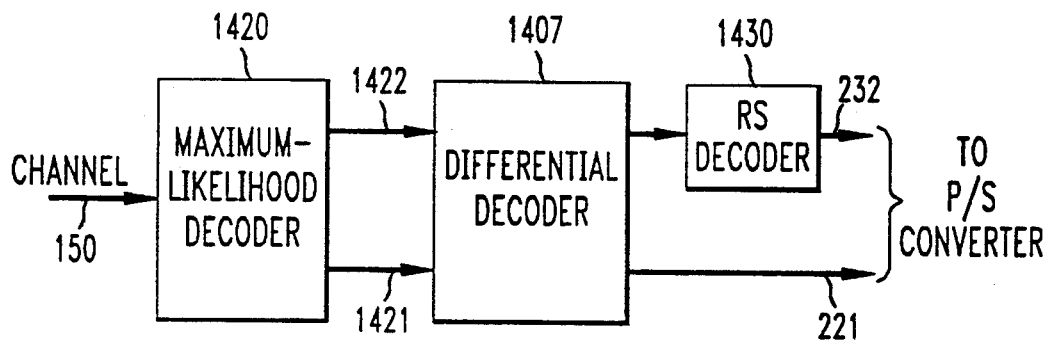
FIGS. 14-16 depict alternative embodiments for the decoder used in the receiver of FIG. 2, these corresponding to the encoders of FIGS. 11-13, respectively.

The encoder/decoder combination of FIGS. 11 and 14 will, indeed, be effective as regards the compensation for phase rotations. What I have appreciated, however, is that with this interdependent processing, errors made by the maximum-likelihood decoder in the non-trellis-encoded bits before they are processed by the RS decoder will cause errors in the trellis-encoded bits at the output of the differential decoder. Thus the error-rate performance of the non-trellis-encoded bits output on lead 1422 of maximum-likelihood decoder 1420, i.e., at a point prior to their being RS decoded by RS decoder 1430, will determine the error-rate performance of the trellis-encoded bits which, in turn, determines the overall error-rate performance (coding gain). Remember that the reason that the RS encoding was included in the overall coding scheme was to raise the error-rate performance of the non-trellis-encoded bits to a level that is greater than that for the trellis-encoded bits so that the latter can dominate the overall error-rate performance. Now, however, the error-rate performance of the trellis-encoded bits has been brought down to the level of performance for the non-trellis-encoded bits that obtained in the first instance, i.e., without using the RS code. The fact that the error-rate performance of the non-trellis-encoded bits is thereafter improved by virtue of their being processed by RS decoder 1430 is of no avail. Thus, no improvement in overall error-rate performance is realized.

In accordance with the invention taught in my co-pending U.S. patent application, Ser. No. 07/869,983, entitled "Rotationally Invariant Coding," filed of even date herewith and assigned to the same assignee and hereby incorporated by reference, the order of differential encoding and RS encoding in the transmitter and differential decoding and RS decoding in the receiver are reversed from the approaches of FIGS. 11 and 14, respectively, as would be followed by the prior art. Thus, the aforementioned problems—the loss of bandwidth efficiency due to the need to increase the error correction capability of the RS code and, more importantly, the loss of the advantage provided by using the RS code to encode the non-trellis-encoded bits—are obviated.

Figure 15:
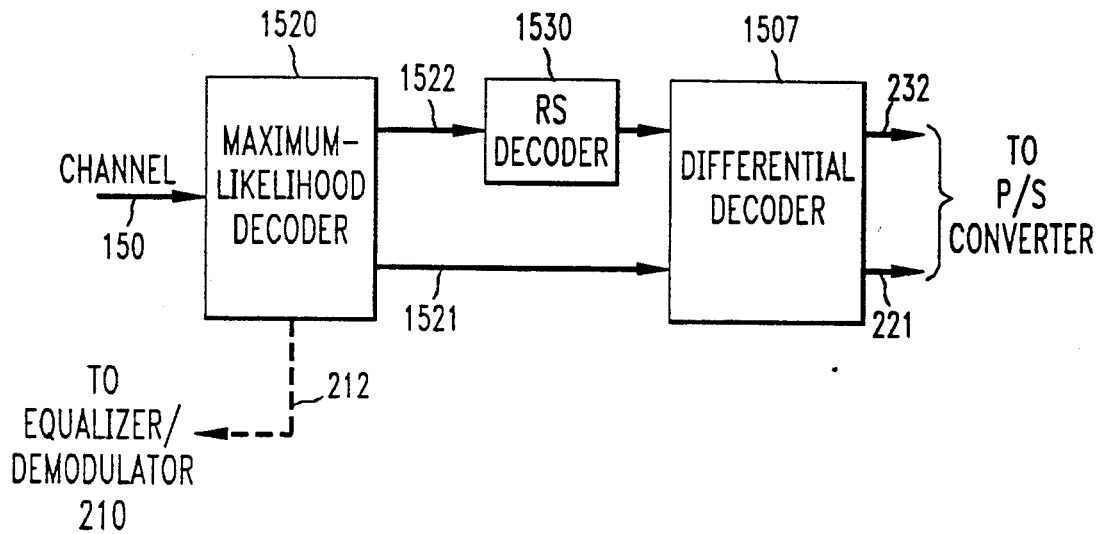

In particular, FIG. 12 shows an embodiment of encoder 11 implementing this approach. The input bits are first applied to differential encoder 1207 and are thereafter RS- and trellis-encoded by RS encoder 1214 and trellis encoder 1212, respectively. The complementary structure that is used to implement decoder 22 in this case is shown in FIG. 15 as comprising maximum-likelihood decoder 1520, RS decoder 1530 and differential decoder 1507.

Now, of course, the bits applied to RS decoder 1530 on lead 1522 will be subject to changes due to phase rotation, as noted earlier. Advantageously, however, I have discovered a technique, also taught in the aforementioned patent application, which provides an RS decoder with the capability of dealing with, i.e., properly operating in the presence of, those changes. That RS decoder is capable of dealing with bit changes of a type wherein bits in corresponding bit positions of each RS word are complemented from their original values. In order to take advantage of that capability here, the overall coded modulation scheme is designed so that any phase rotation which changes the values of the bits that are input to RS decoder 1530 causes those changes to, indeed, be such a complementation.

In particular, the coded modulation scheme is designed in such a way that a 180-degree constellation phase rotation results in a change to each nine-bit word at the input to RS decoder 1530 which is of the type just mentioned. More specifically, it causes a particular one bit of each nine-bit word to be complemented. Thus, the rotation has no effect on the efficacious operation of RS decoder 1530 inasmuch as, again, that decoder uses the technique taught in my above-cited co-pending U.S. patent application, which allows the RS decoder to operate properly even in the presence of such changes. Moreover, the overall coding scheme is designed in such a way as to guarantee that only 180-degree rotations can, in fact, occur. In this embodiment, that result is accomplished by doing two things. The first is to use a trellis code which is only 180-degree rotationally invariant. By this it is meant that, upon the transmission of a sequence of symbols taken from a valid sequence of subsets, and upon the subsequent rotation of those symbols by 180 degrees, the resulting sequence of symbols is a sequence taken from another valid sequence of subsets (which, in this case, is, in fact, the same sequence of subsets). The trellis code implemented by the circuitry of FIG. 8 is, in fact, such a code. Since the code is only 180-degree rotationally invariant and not, for example, 90-degree rotationally invariant, a rotation by 90 or 270 degrees will not have the above property. Thus such a rotation will have a dramatic effect on the operation of maximum-likelihood decoder 1520 and the occurrence of such a rotation can be quickly and readily detected. The second thing done is to, in fact, look for such a rotation. Upon detection of same, maximum-likelihood decoder 1520 provides a control signal on lead 212 to equalizer/demodulator 210. The latter, responsive to the control signal, rotates its output by 90 degrees, thereby providing, as indicated above, an overall rotation which is either 0 degrees (i.e., no rotation) or 180 degrees.

There are many ways of detecting the occurrence of a rotation. One particularly advantageous way relies on my observation that, within the maximum-likelihood decoder, it will be case for at least certain trellis codes—including the trellis code realized by the circuitry of FIG. 8—that when there has been no rotation or a rotation with respect to which the code is invariant, the minimum path metric computed for a present symbol interval is more likely than not to be equal to the sum of a) the minimum path metric computed for the previous symbol interval with b) the minimum branch metric computed for the present symbol interval. (Even in a very noisy environment, in which there may be many symbol errors (e.g., greater than 10%), this equality criterion will be met at least about 60% of the time; and as the symbol error rate decreases, this percentage increases to about 90%.) On the other hand, when there is a rotation with respect to which the code is not invariant, then this equality criterion is not met about 50% of the time. Thus by monitoring this equality criterion, one can easily determine the presence of such a rotation.

(The 4D, 16-state trellis encoder suggested above for use in scheme II has 90-degree symmetry. Thus if one were to want to use that code in place of the 4D, 64-state code implemented by the circuitry of FIG. 8, that code would have to be modified slightly from the version which is disclosed in my aforementioned 1987 *IEEE* paper. The modification would simply be to exchange the roles of the two input bits in their generation of the third trellis-encoder output bit.)

Unlike the earlier-assumed situation of an application in which no phase rotation occurs, the bit patterns of the nine-bit words on leads 115 are not assigned to the symbols of the 4D subsets arbitrarily. Rather, in this example, two criteria must be met. The first criterion is that a particular one bit provided at the output of RS encoder 1214 on lead 115 is used to select one of the two aforementioned 4D types in the identified subset. Thus, for example, looking again at FIG. 5, the value of 0 for this bit would select the first 4D type for the identified subset and the value of 1 for this bit would select the second 4D type for that subset.

The other eight bits on lead 115 are divided into two four-bit groups. Each group selects a particular 2D signal point from a respective one of the 2D subsets that make up the identified 4D type. The second of the aforementioned criteria is that each set of four 2D signal points that are obtained from one another through 90-degree phase rotations are assigned the same bit patterns of the four-bit group. Thus looking at FIG. 4, it will be seen that the four 2D signal points assigned the bit pattern 0001 are 90-degree rotations of each other and the four 2D signal points assigned the bit pattern 0101 are 90-degree rotations of each other.

Overall, then, consider the following example: Assume that the 12-bit pattern on leads 115 and 113 is 000101010001, reading from top to bottom. For pedagogic convenience, we can represent this pattern in four groups thusly: 0001 0101 0 001. From all that has been discussed above, it will be appreciated that the last three bits, 001, identify subset S1 as the subset from which the 4D symbol will be selected. The fourth-to-last bit, 0, identifies that it is the first, as opposed to the second, 4D type of the identified subset from which the symbol is to be selected. In this case, then, it is the 4D type—(a,c). Thus the four last bits of the pattern tell us the two 2D signal points that comprise the 4D symbol are to be selected from 2D subsets a and c, respectively. In particular, the first of these 2D points is that point from subset a which is identified by the first four bits of the 12-bit pattern i.e., the point from subset a assigned to the bit pattern 0001. Similarly, the second of these 2D points is the point from subset c which is identified by the second four bits of the 12-bit pattern, i.e., the point from subset c assigned to the bit pattern 0101.

Consider, now, the consequences of a 180-degree rotation of each of the two constituent 2D signal points of this 4D symbol. The first signal point, from subset a, will rotate to become the signal point in subset b having the same assigned 4-bit pattern, 0001. Similarly, the second signal point, from subset c, will rotate to become the signal point in subset d having the same assigned 4-bit pattern, 0101. This new 4D symbol is in a different 4D type (b,d), but that 4D type is the second 4D type of the same subset S1. Therefore, upon such a rotation, maximum-likelihood decoder 220 will output the 12-bit pattern 0001 0101 1 001 (assuming a correct decision is made).

As desired, then, the only effect of the 180-degree rotation is to complement the ninth bit of the pattern. Indeed, it can be shown that this occurs upon the rotation of any 4D symbol.

Figure 16:
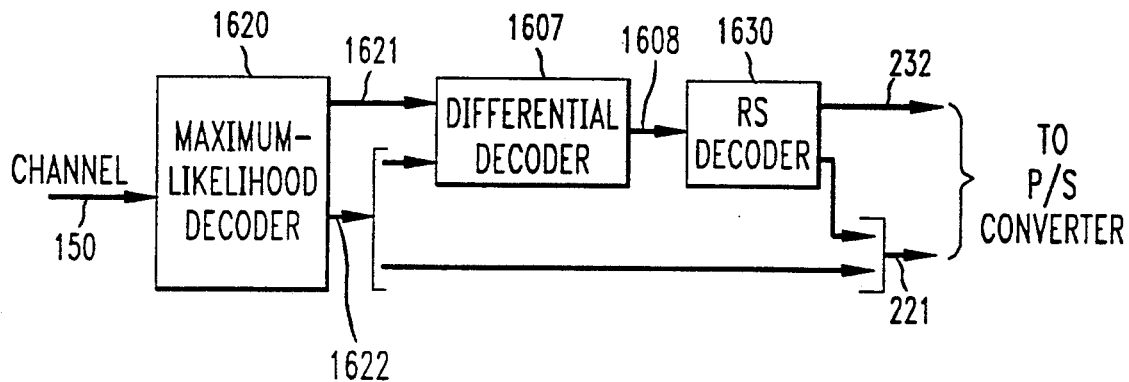

An alternative approach to the introduction of differential encoding into a multilevel coded modulation scheme is described in my co-pending U.S. patent application, Ser. No. 07/869,991 entitled, "Overlapped Multilevel Codes" filed of even date herewith and assigned to the same assignee and hereby incorporated by reference. That approach is illustrated in FIGS. 13 and 16, showing the encoder 11 and decoder 22 that would be used in that case. Here, differential encoder 1307 follows RS encoder 1314 in the transmitter and differential decoder 1607 precedes RS decoder 1630 in the receiver. This approach is similar to that used for the encoder and decoder in FIGS. 11 and 14, respectively. Moreover, the consequences of such an architecture are the same in both situations in that, as previously noted, rotations are not manifest at the input to RS decoder 1630, which is desirable. On the other hand, there still remains the need to obviate the above-discussed problem wherein the error-rate performance of the trellis-encoded bits is brought down to the level of performance for the non-trellis-encoded, not-yet-Reed-Solomon decoded bits.

In accordance with the teachings of this second of my co-pending applications, this problem is overcome by processing the bits in such a way that differentially encoded bits that are to be trellis-encoded are derived from the output of the RS encoder. Experimental tests have confirmed that the error-rate performance (coding gain) for the overall code is, as a result, restored to the original level provided by the trellis code. Thus looking specifically at FIG. 13, it is seen that one or more of the bits on lead 108 is applied to RS encoder 1314 (on lead 1321) along with the non-trellis-encoded bits on lead 109. We have here case 3 discussed above, in which the bits to be differentially encoded are both trellis- and non-trellis-encoded bits. Thus the bit(s) on lead 1321, after being RS-encoded by encoder 1314, are applied to differential encoder 1307 along with one or more of the other RS encoder output bits. The differentially encoded trellis-encoded bits are thereupon provided on lead 1310 to trellis encoder 1312 along with the other trellis encoded bits on lead 1311.

Complementary processing is carried out in the receiver. Thus, as shown in FIG. 16, the non-trellis-encoded bits that are output by maximum-likelihood decoder 1620 on lead 1621 are applied to differential decoder 1607. Of the trellis-encoded bits provided by maximum-likelihood decoder 1620 on lead 1622, one or more are provided to differential decoder 1607 while the other(s) are supplied directly onto lead 221. The output bits of differential decoder 1607 on lead 1608 are RS-decoded by RS decoder 1630. One or more output bits of the latter, corresponding to the bit(s) on lead 1321, are supplied to lead 221. The remainder are supplied to lead 232.

Figure 17:
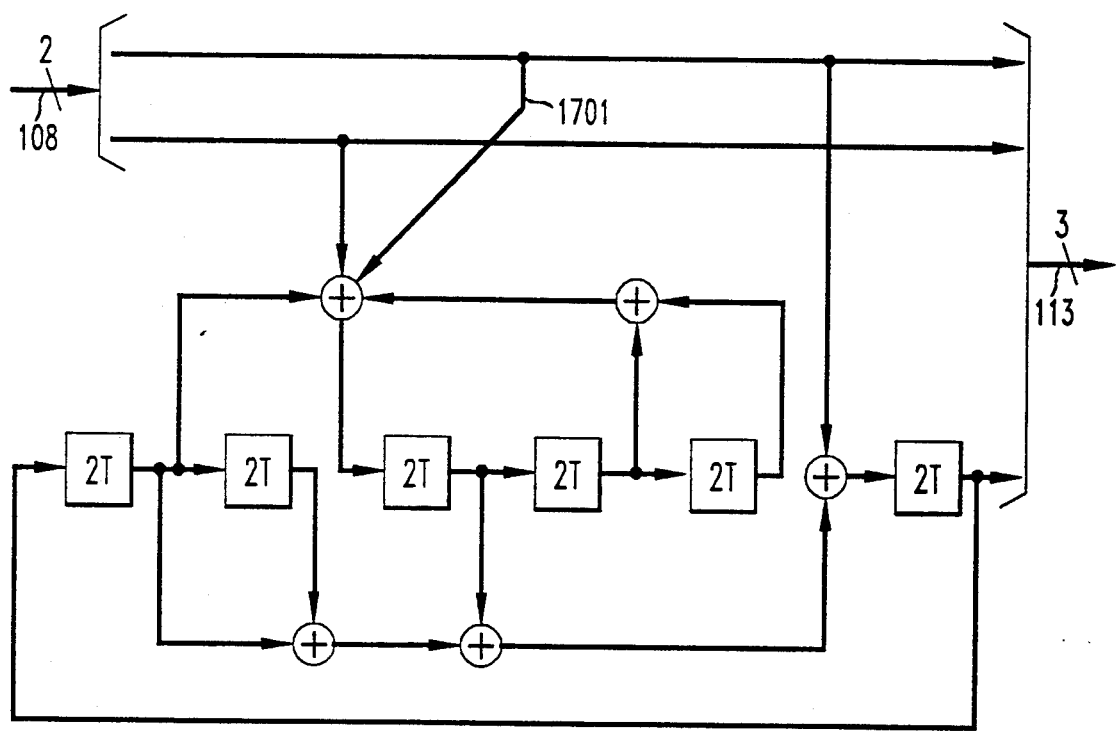
FIG. 17 shows circuitry which implements a particular trellis code that could be used by the trellis encoder of the transmitter of FIG. 1 in conjunction with the encoder of FIG. 13.

The trellis code that is used in this case is illustratively the 90-degree rotationally invariant code implemented by the trellis encoder of FIG. 17.

The coded modulation schemes disclosed herein advantageously provide at least a measure of immunity to impulse noise. Specifically, the corruption of a given symbol by impulse noise occurring within a particular RS frame can be corrected for—assuming no other errors within that frame from impulse noise or any other source—in that a) the trellis code is powerful enough to allow for the detection of the correct subset—and thus the correct trellis-encoded bits—in the receiver and b) the RS code can detect and correct any error made by the maximum-likelihood decoder in the detection of the transmitted symbol in that subset—and thus can correct non-trellis-encoded bits. Advantageously, impulse noise that may extend over two or more contiguous symbols can also be dealt with by employing a known type of interleaver which is used to separate contiguous signal points as they traverse the channel, thereby distributing the effect of any particular impulse noise event—upon de-interleaving in the receiver—into various different frames. This implies the joint selection of the interleaver parameters and the RS frame length in order to meet any overall decoding delay requirements of the system consistent with desired bandwidth efficiency objectives.

The foregoing merely illustrates the principles of the present invention. For example, although particular bit rates, codes, constellations and partitionings are shown herein and particular parameter values (e.g., for N, k, etc.) are used, these are all merely illustrative. For example, various different source bit rates can be accommodated via the use of a) RS words of different size (number of bits) in combination with b) various different constellation sizes, without, in general, the need to change, for example, the encoding/decoding algorithms of the RS and trellis codes nor the RS frame length. Moreover, it may be noted that a 2N-dimensional constellation may be comprised of constituent constellations of any lower order, e.g., a 4D constellation may be comprised of four 1D constellations. Also, certain 2N-dimensional constellations may be such as to not be resolvable into constituent, lower-dimensional constellations. Moreover, although the invention is illustrated herein in the context of a passband transmission arrangement, it can also be used in baseband arrangements.

Moreover, although particular applications in which the coded modulation scheme of the present invention are disclosed, the invention is usable in other applications as well.

Additionally, it may be noted that, although the invention is illustrated herein as being implemented with discrete functional building blocks, e.g., encoders, mappers, etc., the functions of any one or more of those building blocks can be carried out using one or more appropriately programmed processors, digital signal processing (DSP) chips, etc. Thus although each of the various "means" recited in the claims hereof may correspond, in some embodiments, to specific circuitry which is specifically designed to perform the function of just that means, it will be appreciated that such "means" may alternatively correspond, in other embodiments, to the combination of processor-based circuitry with stored program instructions which cause that circuitry to perform the function in question.

It will thus be appreciated that those skilled in the art will be able to devise numerous and various alternative arrangements which, although not explicitly shown or described herein, embody the principles of the invention and are within its spirit and scope.

I claim:

1. Transmitter apparatus comprising
first and second redundancy encoders,
means for applying first and second streams of data to said first and second redundancy encoders, respectively,
mapping means for providing channel symbols selected from a predetermined signal constellation in response to the outputs of said encoders, said signal constellation having a plurality of subsets of channel symbols, the channel symbols being separated from each other by a predetermined distance, characterized in that said first and second encoders are a trellis encoder and a Reed-Solomon encoder, respectively, and wherein:
said mapping means a) identifies a sequence of said subsets in response to the output of said trellis encoder, the sequence having a trellis distance, and b) selects a channel symbol from each subset of said sequence in response to the output of said Reed-Solomon encoder, and
the trellis distance is greater than the predetermined distance.

2. The invention of claim 1 further comprising means for generating a passband signal representing the channel symbols provided by said mapping means and for applying said passband signal to a transmission channel.

3. The invention of claim 1 wherein said mapping means and said trellis encoder, in combination, provide a first particular level of error rate performance for said first stream of data and wherein said mapping means, said trellis encoder and said Reed-Solomon encoder, in combination, provide a second particular level of error-rate performance for said second stream of data which is at least as great as said first particular level of error rate performance.

4. The invention of claim 1 wherein said signal constellation is a 2N-dimensional constellation based on a rectangular lattice, N being an integer.

5. The invention of claim 4 wherein there are 4N of said subsets.

6. The invention of claim 5 wherein said Reed-Solomon encoder implements a single-error-correcting Reed-Solomon code.

7. The invention of claim 6 wherein said trellis encoder implements a four-dimensional trellis encoder.

8. The invention of claim 5 wherein said Reed-Solomon encoder implements a double-error-correcting Reed-Solomon code.

9. The invention of claim 8 wherein said trellis encoder implements a two-dimensional, trellis encoder.

10. Receiver apparatus for processing a received signal that was generated by applying first and second data streams to a trellis encoder and a Reed-Solomon encoder, respectively, to provide first and second encoder output streams, respectively, and by thereafter providing, in said generated signal, a sequence of channel symbols having a trellis distance and being selected from a predetermined 2N-dimensional signal constellation based on a rectangular lattice, N being an integer, said signal constellation comprising a plurality of subsets of channel symbols separated by a predetermined distance, which is less than said trellis distance, said channel symbols being selected in response to said first and second encoder output streams, said receiver apparatus comprising
means including a maximum likelihood decoder for recovering from said received signal a) said first data stream and b) said second encoder output stream,
a Reed-Solomon decoder, and
means for applying said recovered second encoder output stream to said Reed-Solomon decoder to recover said second data stream.

11. A method comprising the steps of
applying first and second streams of data to a trellis encoder and a Reed-Solomon encoder, respectively, and
generating, in response to the outputs of said encoders, an output signal representing channel symbols selected from a predetermined signal constellation, said signal constellation comprising a plurality of subsets of channel symbols separated by a predetermined distance, and wherein said generating step includes the steps of:

identifying a sequence of said subsets in response to the output of said trellis encoder, the sequence having a trellis distance, and selecting a channel symbol from each subset of said sequence in response to the output of said Reed-Solomon encoder, wherein the trellis distance is greater than the predetermined distance.

12. The invention of claim 11 wherein said generating step includes the steps of generating, as said output signal, a passband signal representing the selected channel symbols, and applying said passband signal to a transmission channel.

13. The invention of claim 11 wherein the combination of said applying and generating steps provides a first particular level of error rate performance for said first stream of data and a second particular level of error-rate performance for said second stream of data which is at least as great as said first particular level of error rate performance.

14. The invention of claim 11 wherein said signal constellation is a 2N-dimensional constellation based on a rectangular lattice, N being an integer.

15. The invention of claim 14 wherein there are 4N of said subsets.

16. The invention of claim 15 wherein said Reed-Solomon encoder implements a single-error-correcting Reed-Solomon code.

17. The invention of claim 16 wherein said trellis encoder implements a four-dimensional trellis encoder.

18. The invention of claim 15 wherein said Reed-Solomon encoder implements a double-error-correcting Reed-Solomon code.

19. The invention of claim 18 wherein said trellis encoder implements a two-dimensional trellis encoder.

* * * * *